United States Patent
Yi

(10) Patent No.: US 11,874,369 B2
(45) Date of Patent: Jan. 16, 2024

(54) LOCATION DETECTION METHOD, APPARATUS, DEVICE AND READABLE STORAGE MEDIUM

(71) Applicant: APOLLO INTELLIGENT CONNECTIVITY (BEIJING) TECHNOLOGY CO., LTD., Beijing (CN)

(72) Inventor: Guangqi Yi, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 364 days.

(21) Appl. No.: 17/209,907

(22) Filed: Mar. 23, 2021

(65) Prior Publication Data

US 2021/0223392 A1    Jul. 22, 2021

(30) Foreign Application Priority Data

Jul. 21, 2020    (CN) .......................... 202010706311.5

(51) Int. Cl.
   *G01S 13/931*    (2020.01)
   *G01C 21/26*     (2006.01)
   *G01S 13/42*     (2006.01)

(52) U.S. Cl.
   CPC ............ *G01S 13/931* (2013.01); *G01C 21/26* (2013.01); *G01S 13/42* (2013.01)

(58) Field of Classification Search
   CPC ........ G01S 13/931; G01S 13/42; G01S 13/06; G01S 13/91; G01S 7/354;
   (Continued)

(56) References Cited

U.S. PATENT DOCUMENTS 9,977,123 B2 *    5/2018    Chen .................... G01S 13/867
11,353,544 B2 *   6/2022    Bolduc ................. G01S 13/931
(Continued)

FOREIGN PATENT DOCUMENTS

AU    2014202300 A1    1/2018
CN    107340513 A      11/2017
(Continued)

OTHER PUBLICATIONS

M. Z. Ikram, A. Ahmad and D. Wang, "High-accuracy distance measurement using millimeter-wave radar," 2018 IEEE Radar Conference (RadarConf18), Oklahoma City, OK, USA, 2018, pp. 1296-1300, doi: 10.1109/RADAR.2018.8378750. (Year: 2018).*

(Continued)

*Primary Examiner* — Vladimir Magloire
*Assistant Examiner* — Yonghong Li
(74) *Attorney, Agent, or Firm* — Tucker Ellis LLP

(57) ABSTRACT

The present application discloses a location detection method, an apparatus, a device and a readable storage medium, which relate to vehicle infrastructure cooperation and automatic driving in intelligent transportation. A specific implementation solution is as follows: after acquiring an initial location of a target object, a millimeter wave radar projects the initial location onto an upper interface and a lower interface of a road section respectively to obtain a first projection location and a second projection location, and then determines an accurate location of the target object according to the first projection location and the second projection location. In this process, the initial location is mapped twice to make full use of an association relationship between an installation point and installation environment, so that the target location is no longer an approximate location, but a precise location obtained according to geo- (Continued)

metric projection, which improves accuracy of location detection.

20 Claims, 5 Drawing Sheets

(58) Field of Classification Search
CPC .. G01S 2013/9316; G01S 7/003; G01S 7/356; G01C 21/26; G01C 21/28
See application file for complete search history.

(56) References Cited

U.S. PATENT DOCUMENTS

| | | | |
|---|---|---|---|
| 2010/0085237 | A1 | 4/2010 | Cornic |
| 2013/0335261 | A1 | 12/2013 | Kajiki |
| 2016/0238703 | A1 | 8/2016 | Liu |
| 2020/0218979 | A1* | 7/2020 | Kwon ............... B60W 30/14 |

FOREIGN PATENT DOCUMENTS

| | | |
|---|---|---|
| CN | 107462885 A | 12/2017 |
| CN | 109283534 A | 1/2019 |
| CN | 110726979 A | 1/2020 |
| CN | 111077506 A | 4/2020 |
| CN | 111401208 A | 7/2020 |
| DE | 102018104808 A1 | 9/2019 |
| JP | 2000322685 A | 11/2000 |
| JP | 2001023078 A | 1/2001 |
| JP | 2010204047 A | 9/2010 |
| JP | 2019066240 A | 4/2019 |
| RU | 2658679 C1 | 6/2018 |
| WO | WO2017218093 A1 | 12/2017 |

OTHER PUBLICATIONS

The EESR of EP21164050.3.
First Office Action of the counterpart application CN202010706311.5.
"Analysis of signal processing Software for FM CW millimeter wave radar", Journal of Naval Aeronautical and Astronautical University, vol. 35, No. 1, Feb. 28, 2020, pp. 106-112.
"High-accuracy distance measurement using millimeter-wave radar", 2018 IEEE Radar Conference, Jun. 11, 2018, pp. 1290-1300.
First Office Action of the parallel application JP2021-052424.

* cited by examiner

LOCATION DETECTION METHOD, APPARATUS, DEVICE AND READABLE STORAGE MEDIUM

CROSS-REFERENCE TO RELATED APPLICATIONS

This application claims priority to Chinese Patent Application No. 202010706311.5, filed on Jul. 21, 2020, which is hereby incorporated by reference in its entirety.

TECHNICAL FIELD

The present application relates to the field of vehicle infrastructure cooperation and automatic driving in intelligent transportation, and in particular, to a location detection method, an apparatus, a device and a readable storage medium.

BACKGROUND

Vehicle-to-everything (V2X) interconnection technology realizes real-time dissemination of traffic information between vehicles and between vehicles and transportation facilities. In a specific implementation of V2X, vehicle infrastructure cooperation technology is proposed. Vehicle infrastructure cooperation technology adopts wireless communication technology and the like to fully realize an effective cooperation of people, vehicles and roads through real-time information interaction, improving traffic efficiency while ensuring traffic safety.

A basis of the vehicle infrastructure cooperation technology is perception of surrounding environment of a vehicle. Only on the basis of the perception can further determine the vehicle's executable driving behavior in current environment. In the current vehicle infrastructure cooperation technology, a roadside device uses a radar to perceive a relative location of a target on a road and the like, and obtain perception information according to the relative location and the like. Normally, the roadside device approximately takes a distance between the radar and the target as a distance between a projection point of the radar on the ground and the target, so as to obtain the relative location of the target.

In the above environment perception process, accuracy of the relative location of the target with respect to the radar is poor, and accurate perception information cannot be obtained according to the relative location.

SUMMARY

The present application provides a location detection method, an apparatus, a device and a readable storage medium. By introducing an association relationship between an installation point of a millimeter wave radar and installation environment, an accurate target location of a target object is obtained, thereby achieving effective and safe vehicle infrastructure cooperation.

In a first aspect, an embodiment of the present application provides a location detection method, including:
   determining an initial location of a target object, where the initial location is a relative location of the target object with respect to a millimeter wave radar;
   projecting the initial location onto an upper interface of a road section to obtain a first projection location, and projecting the initial location onto a lower interface of the road section to obtain a second projection location, where the upper interface and the lower interface are perpendicular to a body surface of the millimeter wave radar, the upper interface is determined according to a high point on the road section acquired in advance, and the lower interface is determined according to a low point on the road section acquired in advance; and
   determining a target location of the target object according to the first projection location and the second projection location.

In a second aspect, an embodiment of the present application provides a location detection apparatus, including:
   a first determining module, configured to determine an initial location of a target object, where the initial location is a relative location of the target object with respect to a millimeter wave radar;
   a projecting module, configured to project the initial location onto an upper interface of a road section to obtain a first projection location, and project the initial location onto a lower interface of the road section to obtain a second projection location, where the upper interface and the lower interface are perpendicular to a body surface of the millimeter wave radar, the upper interface is determined according to a high point on the road section acquired in advance, and the lower interface is determined according to a low point on the road section acquired in advance;
   a second determining module, configured to determine a target location of the target object according to the first projection location and the second projection location.

In a third aspect, an embodiment of the present application provides an electronic device, including:
   at least one processor; and
   a memory, in a communicational connection with the at least one processor; where,
   the memory stores instructions executable by the at least one processor, the instructions are executed by the at least one processor to enable the at least one processor to perform the method of the first aspect or any possible implementations of the first aspect.

In a fourth aspect, an embodiment of the present application provides a computer program product containing instructions, which, when running on an electronic device, causes the electronic device to perform the method of the first aspect or various possible implementations of the first aspect.

In a fifth aspect, an embodiment of the present application provides a non-transitory computer-readable storage medium storing computer instructions, where the computer instructions are used to cause an electronic device to perform the method of the first aspect or various possible implementations of the first aspect.

In a sixth aspect, an embodiment of the present application provides a vehicle infrastructure cooperation method, including:
   determining a body surface of a millimeter wave radar and an upper interface and a lower interface of a road section, where the body surface is a plane where the millimeter wave radar is located, and the road section is between the upper interface and the lower interface;
   determining a target location of a target object according to the body surface, the upper interface and the lower interface; and performing vehicle infrastructure cooperation according to the target location.

In the location detection method, apparatus, device and readable storage medium provided by the embodiments of the present application, a millimeter wave radar acquires an association relationship between an installation point and installation environment in advance, and the association relationship is, for example, setting an upper interface and a lower interface for a road section covered by the millimeter wave radar, where the upper interface and the lower interface are perpendicular to a body surface where the installation point of the millimeter wave radar is located, and the road section is between the upper interface and the lower interface. Then, after acquiring an initial location of a target object, the millimeter wave radar projects the initial location onto the upper interface and the lower interface respectively to obtain a first projection location and a second projection location, and then determines an accurate location of the target object according to the first projection location and the second projection location. In this process, the initial location is mapped twice to make full use of the association relationship between the installation point and the installation environment, so that the target location is no longer an approximate location, but a precise location obtained according to geometric projection, which improves accuracy of location detection.

It should be understood that the content described in this section is not intended to identify key or important features of the embodiments of the present application, nor is it intended to limit the scope of the present application. Other features of the present application will be easily understood through the following description.

BRIEF DESCRIPTION OF DRAWINGS

The accompanying drawings are used to better understand solutions, and do not limit the present application. In the accompanying drawings.

DESCRIPTION OF EMBODIMENTS

Figure 1:
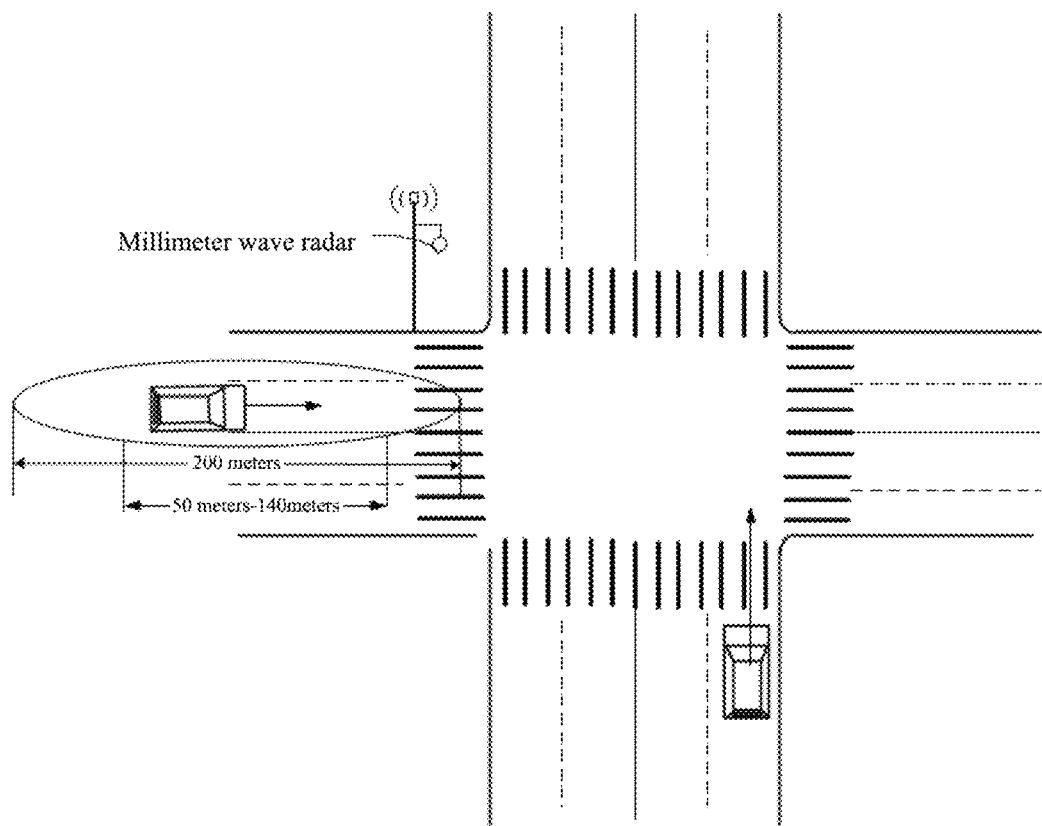
FIG. 1 is a schematic diagram of a scene of correcting location information based on an FOV angle.

The following describes exemplary embodiments of the present application in combination with the accompanying drawings, in which various details of the embodiments of the present application are included to facilitate understanding, and they shall be considered as merely exemplary. Therefore, those skilled in the art should realize that various changes and modifications can be made to the embodiments described herein without departing from the scope and spirit of the present application. Similarly, for the sake of clarity and conciseness, the description of well-known functions and structures is omitted in the following.

At present, in terms of traffic information control, a millimeter wave radar is used to measure locations of target objects such as vehicles and pedestrians in a coverage area. A measurement principle is as follows: for a target object on a flat road section, the millimeter wave radar obtains energy of a millimeter wave main lobe and side lobe that an antenna actively sends to the target object, and transforms the energy to a frequency domain through fast Fourier transform (FFT) and performs analysis to obtain location information. For a target object on a road section close to the millimeter wave radar, a measurement of location information depends on an amplitude after a millimeter wave sent by the antenna collides with the target object. For a target object on a road section far away from the millimeter wave radar, since angular resolution of millimeter wave radar detection is mostly 1°, as a distance increases, there are more and more detection points on an arc of 1°, which leads to decrease of location accuracy of the target object. At this time, it is necessary to correct the location information of the target object using a speed detected by Doppler principle as a reference.

A measurement model on which the above measurement principle is based is: taking an installation point of the millimeter wave radar as an original point, taking a distance between the installation point of the millimeter wave radar and the target object approximately as a distance between a projection point of the radar on the ground and the target object, and obtaining, according to the distance, a relative location of the target object with respect to the millimeter wave radar.

Obviously, for the road section close to the millimeter wave radar, since the distance between the installation point and the target object is much greater than the distance between the projection point of the millimeter wave radar and the target object, the relative location obtained according to the above approach is extremely inaccurate, and a deviation is about 1 meter. This inaccurate relative location cannot be used in a scene that requires higher data accuracy such as vehicle infrastructure cooperation.

In order to improve the accuracy of the location information, half of an initial field of vision (FOV) of the millimeter wave radar is used as a projection correction angle. In this approach, with the installation point of the millimeter wave radar being taken as the original point, a distance between the millimeter wave radar and the target object is projected to a normal direction of the millimeter wave radar by utilizing an installation initialization parameter of the millimeter wave radar, and the location information of the target object is determined according to a distance projected on a normal. However, correction capability of this correction approach is limited. Exemplarily, please refer to FIG. 1.

FIG. 1 is a schematic diagram of a scene of correcting location information based on an FOV angle. Please refer to FIG. 1, assuming that a distance between a projection point of a millimeter wave radar on the ground to a farthest detection point of the millimeter wave radar is 200 meters, this correction approach has a certain correction effect on location information of a target object in a range of about 50-140 meters. However, location information of a target object in a remaining range cannot be repaired.

In the above location detection process, capability to obtain an accurate location of the target object is limited, which cannot meet a scene with higher data accuracy requirements such as vehicle infrastructure cooperation. Moreover, the above location detection method requires that a road section within a coverage area of the millimeter wave radar is a flat road section. However, in practice, the road section is likely to be a ramp road section, a wave road section, etc. Obviously, an application range of the above location detection method is very limited.

In view of this, embodiments of the present application provide a location detection method, an apparatus, a device and a readable storage medium. By introducing an association relationship between an installation point of a radar and installation environment, an accurate target location of a target object is obtained, thereby achieving effective and safe vehicle infrastructure cooperation.

Figure 2:
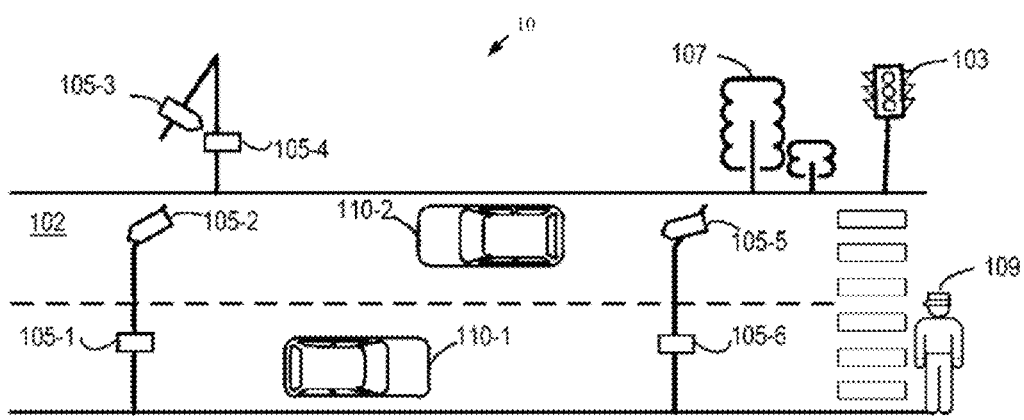
FIG. 2 is a schematic diagram of traffic operation environment to which a location detection method according to an embodiment of the present application is applicable.

FIG. 2 is a schematic diagram of traffic operation environment to which a location detection method according to an embodiment of the present application is applicable. Please refer to FIG. 2, the traffic operation environment shows some typical objects, including a road 102, a traffic indication facility 103, plants 107 on both sides of the road, and a pedestrian 109 that may appear. It should be understood that the facilities and objects shown are only examples. According to actual conditions, objects that may appear in different traffic environment will change. The scope of the embodiments of the present disclosure is not limited in this respect.

In the example of FIG. 2, one or more vehicles 110-1, 110-2 are travelling on the road 102. For ease of description, a plurality of vehicles 110-1 and 110-2 are collectively referred to as vehicles 110. A vehicle 110 may be any type of vehicle that can carry people and/or things and move through a power system such as an engine, including but not limited to a car, a truck, a bus, an electric vehicle, a motorcycle, a touring car, a train, and so on. One or more vehicles 110 in environment 10 are vehicles with certain positioning capability and certain automatic driving capability. Of course, another one or some vehicles 110 in the environment 10 may also be vehicles that do not have positioning capability and automatic driving capability.

One or more millimeter wave radars 105-1 to 105-6 (collectively referred to as millimeter wave radars 105) are also arranged in the environment 10. The millimeter wave radars 105 are independent of the vehicles 110 and are used to detect a target location of a target object in the environment 10, such as a vehicle 110, a pedestrian 109, etc. In order to detect the environment 10 in all directions, the millimeter wave radars 105 are arranged near the road 102. For example, the millimeter wave radars 105 are arranged on both sides of the road 102 at a certain interval for detecting a specific road section of the environment 10.

In the embodiments of the present application, the millimeter wave radar 105 is, for example, a millimeter wave radar with computing capability. At this time, the millimeter wave radar acquires an initial location, and performs projecting of the initial location and so on to determine a target location. Or, the millimeter wave radar 105 establishes a network connection with a roadside device (not shown in the figure) and the like; the millimeter wave radar sends an initial location of a target object and the like to the roadside device, and the roadside device performs projecting of the initial location and so on to determine a target location.

Hereinafter, based on the traffic operation environment shown in FIG. 2, a location detection method according to embodiments of the present application will be described in detail by taking an example in which a millimeter wave radar acquires an initial location and performs projecting of the initial location and so on to determine a target location. Exemplarily, please refer to FIG. 3.

Figure 3:
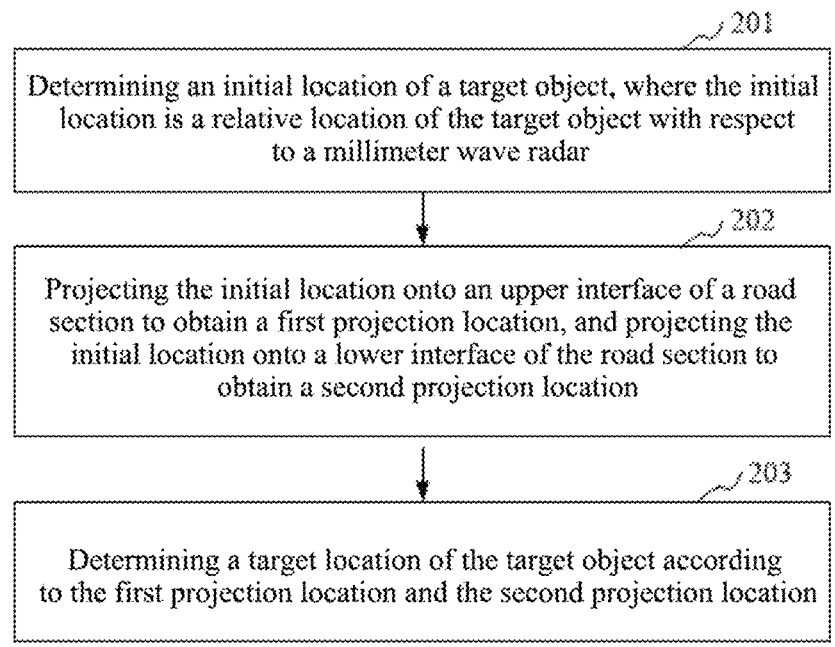
FIG. 3 is a flowchart of a location detection method according to an embodiment of the present application.

FIG. 3 is a flowchart of a location detection method according to an embodiment of the present application. An executive entity of this embodiment is a millimeter wave radar, and this embodiment includes:

201: determining an initial location of a target object, where the initial location is a relative location of the target object with respect to the millimeter wave radar.

Exemplarily, the millimeter wave radar takes its own installation point as an original point, takes a distance between the original point and the target object approximately as a distance between a projection point of the millimeter wave radar on ground and the target object, and obtains, according to the distance, a relative location of the target object with respect to the millimeter wave radar. The relative location is the initial location disclosed in the embodiment of the present application.

202: projecting the initial location onto an upper interface of a road section to obtain a first projection location, and projecting the initial location onto a lower interface of the road section to obtain a second projection location.

A body surface is, for example, a plane where an upper surface or a lower surface of the millimeter wave radar is located. The upper surface is a surface where the millimeter wave radar emits millimeter waves. The upper interface and the lower interface are perpendicular to the body surface of the millimeter wave radar, the upper interface is determined according to a high point on the road section acquired in advance, and the lower interface is determined according to a low point on the road section acquired in advance.

Exemplarily, the millimeter wave radar establishes an association relationship between the installation point of the millimeter wave radar and installation environment in advance. The association relationship is, for example, setting an upper interface and a lower interface for a road section covered by the millimeter wave radar, where the upper interface and the lower interface are perpendicular to the body surface where the installation point of the millimeter wave radar is located. The road section is between the upper interface and the lower interface.

In the above embodiment, when determining the upper interface and the lower interface, a variety of manners are used to acquire the high point and the low point of the road section in advance, for example, driving a vehicle equipped with a sensor to collect, on the road section, the high point and the low point of the road section. For another example, the high point and low point of the road section is acquired using a real-time kinematic (RTK) measuring instrument. Then, the millimeter wave radar performs plane fitting based on points near the high point to obtain the upper interface, and performs plane fitting based on points near the low point to obtain the lower interface. The upper interface and the lower interface are perpendicular to the body surface. The high point and the low point are points determined according to certain detection and calculation rules, not necessarily the real highest and lowest points on the entire road section. For example, the high point on the road section refers to a point on the road section higher than a first preset height relative to a horizontal plane; and the low point on the road section refers to a point on the road section lower than a second preset height relative to the horizontal plane. The first preset height is greater than or equal to the second preset height.

After obtaining the above association relationship and initial location, the millimeter wave radar projects the initial location onto the upper interface of the road section to obtain the first projection location. The millimeter wave radar also projects the initial location to the lower interface of the road section to obtain the second projection location. This projection process is equivalent to mapping the initial location twice, making full use of the association relationship between the installation point of the millimeter wave radar and the installation environment.

203: determining a target location of the target object according to the first projection location and the second projection location.

Exemplarily, when the millimeter wave radar determines the target location of the target object, it is no longer simply to take the distance between the installation point of the millimeter wave radar and the target object approximately as the distance between the projection point of the millimeter wave radar on the ground and the target object, and to obtain a relative location of the target object with respect to the millimeter wave radar according to the distance. Instead, the target location is determined strictly according to a geometric projection location.

In the location detection method provided by the embodiment of the present application, the millimeter wave radar acquires the association relationship between the installation point of the millimeter wave radar and the installation environment in advance, and the association relationship is, for example, setting the upper interface and the lower interface for the road section covered by the millimeter wave radar, where the upper interface and the lower interface are perpendicular to the body surface where the installation point of the millimeter wave radar is located, and the road section is between the upper interface and the lower interface. Then, after acquiring the initial location of the target object, the millimeter wave radar projects the initial location onto the upper interface and the lower interface respectively to obtain the first projection location and the second projection location, and then determines the accurate location of the target object according to the first projection location and the second projection location. In this process, the initial location is mapped twice to make full use of the association relationship between the installation point and the installation environment, so that the target location is no longer an approximate location, but a precise location obtained according to geometric projection, which improves accuracy of location detection.

In the above embodiment, when determining the target location of the target object according to the first projection location and the second projection location, the millimeter wave radar first determines a first distance between the initial location and the upper interface, and a second distance between the initial location and the lower interface. Then, the millimeter wave radar determines a first weight according to the first distance, and determines a second weight according to the second distance. Finally, the millimeter wave radar determines the target location according to the first weight, the second weight, the first projection location and the second projection location.

Exemplarily, the initial location is an approximate location, and there is a certain deviation between the initial location and the accurate location of the target object on the road section. After obtaining the initial location, the millimeter wave radar determines a vertical line between the initial location and the upper interface, and an intersection point of the vertical line and the upper interface is the first projection location. Similarly, the millimeter wave radar determines a vertical line between the initial location and the lower interface, and an intersection point between the vertical line and the lower interface is the second projection location. In addition, the millimeter wave radar can also extend the vertical line between the initial location and the upper interface, and the extended vertical line intersects the lower interface at a point, which is the second projection location.

The first weight and the second weight are, for example, preset parameters or obtained according to other manners. After obtaining the first weight, the second weight, the first projection location and the second projection location, the millimeter wave radar uses the first weight to weight the first projection location, and uses the second weight to weight the second projection location. Finally, the weighted first projection location and the second projection location are summed to obtain the target location.

By adopting this solution, the target location is more accurate by projecting the initial location twice onto the upper interface and the lower interface and performing weighting estimation.

In the above embodiment, when the millimeter wave radar determines the first weight according to the first distance, and determines the second weight according to the second distance, the millimeter wave radar determines whether the first distance is greater than a preset threshold. If the first distance is greater than the preset threshold, the first weight is determined to be equal to 0; if the first distance is less than or equal to the preset threshold, the first weight is determined according to a reciprocal of the first distance. Similarly, when the millimeter wave radar determines the second weight, the millimeter wave radar will determine whether the second distance is greater than the preset threshold. If the second distance is greater than the preset threshold, the second weight is determined to be equal to 0; if the second distance is less than or equal to the preset threshold, the second weight is determined according to a reciprocal of the second distance.

Exemplarily, let the first weight to be $W_1$ and the second weight to be $W_2$, then the millimeter wave radar can determine the first weight $W_1$ and the second weight $W_2$ through the following formula (1):

$$W_i = \begin{cases} 0, d_i > T \\ \dfrac{1}{a_i}, d_i \leq T \end{cases}. \qquad \text{formula (1)}$$

In formula (1), $i \in \{1,2\}$, when i=1, $d_1$ represents the first distance; when i=2, $d_2$ represents the second distance. T represents the preset threshold, which is an empirical value and can be set flexibly.

After obtaining the first weight $W_1$ and the second weight $W_2$ according to formula (1), the millimeter wave radar determines the target location of the target object according to the following formula (2):

$$P = \sum_{i=1}^{2} W_i P_i. \qquad \text{formula (2)}$$

In formula (2), $i \in \{1,2\}$, when i=1, $P_1$ represents the first projection location; when i=2, $P_2$ represents the second projection location. Each projection location represents (x, y, z) coordinates. The weighting of the first projection location by the millimeter wave radar using the first weight $W_1$ refers to that: the millimeter wave radar uses the first weight $W_1$ to weight each coordinate of the first projection location, for example, the first weight $W_1$ is multiplied by coordinates of the first projection location to obtain new (x, y, z) coordinates. The process of the millimeter wave radar weighting the second projection location using the second weight $W_2$ is similar, and will not be repeated here.

By adopting this solution, the millimeter wave radar weights the first projection location according to the first weight, and weights the second projection location according to the second weight, so that the target location is more accurate.

In the above embodiment, when the millimeter wave radar obtains the association relationship between the installation point and the installation environment, that is, before the millimeter wave radar projects the initial location onto the upper interface of the road section to obtain the first projection location, and projects the initial location onto the lower interface of the road section to obtain the second projection location, it is necessary to determine the body surface of the millimeter wave radar and the upper interface and the lower interface of the road section. In the following, how the millimeter wave radar obtains the body surface of the millimeter wave radar and the upper interface and the lower interface of the road section will be described in detail.

First, the millimeter wave radar obtains the body surface.

When obtaining the body surface, the millimeter wave radar first determines three points, namely respective coordinates of a first point, a second point and a third point. After that, the millimeter wave radar determines the body surface according to a first coordinate of a first point, a second coordinate of a second point and a third coordinate of a third point. The first point is the installation point of the millimeter wave radar, the second point is a projection point of the millimeter wave radar along the body surface of the millimeter wave radar toward the road section, and the third point is a projection point of any point on a control rod along the body surface of the millimeter wave radar toward the road section after moving the control rod to the body surface. Exemplarily, please refer to FIG. 4A and FIG. 4B.

Figure 4A:
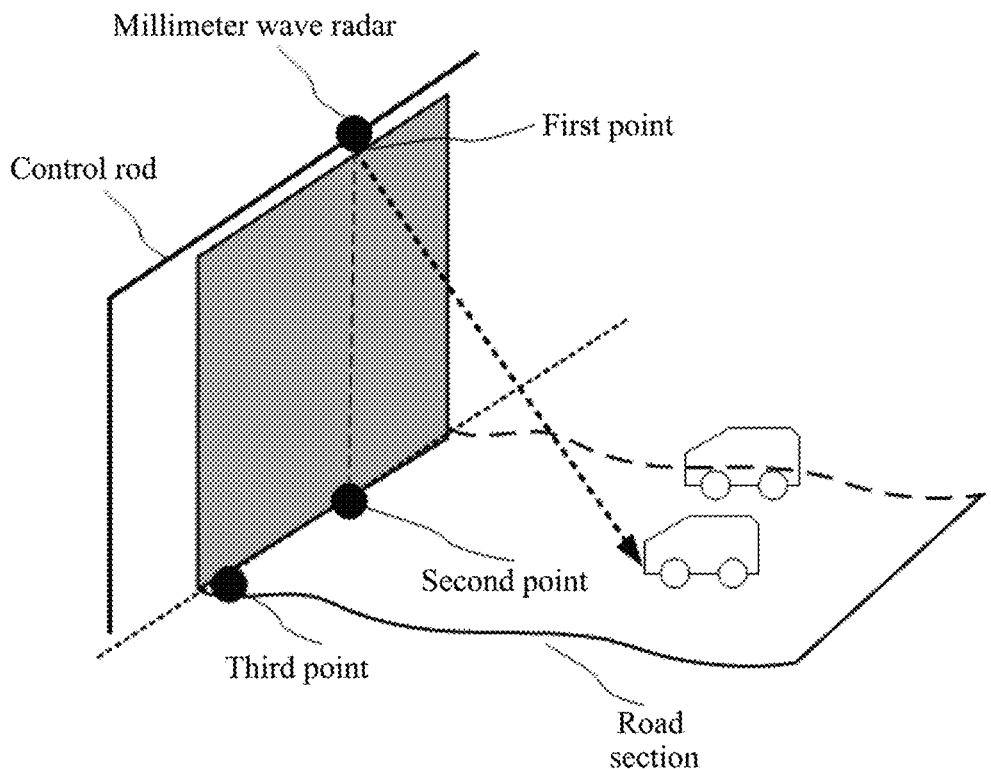
FIG. 4A is a schematic diagram of determining a body surface in a location detection method according to an embodiment of the present application.

FIG. 4A is a schematic diagram of determining a body surface in a location detection method according to an embodiment of the present application. Please refer to FIG. 4A, in a scene where a millimeter wave radar is installed non-obliquely, the millimeter wave radar determines a first point, a second point, and a third point in sequence when determining its body surface.

For the first point, the millimeter wave radar directly takes three-dimensional location coordinates of its own installation point as location coordinates of the first point.

For the second point, the millimeter wave radar makes a projection point of the first point along the body surface towards the road section, and takes the projection point as the second point. That is to say, the second point is a point on the body surface of the millimeter wave radar, not necessarily a projection point of the first point on a horizontal plane. However, since the millimeter wave radar is installed non-obliquely in FIG. 4A, at this time, the projection point of the first point on the horizontal plane is the second point.

For the third point, after moving the control rod horizontally to the body surface of the millimeter wave radar, any point on the control rod is projected along the body surface to obtain the third point. The third point and the second point are two different points, that is, the third point and the second point do not coincide.

Figure 4B:
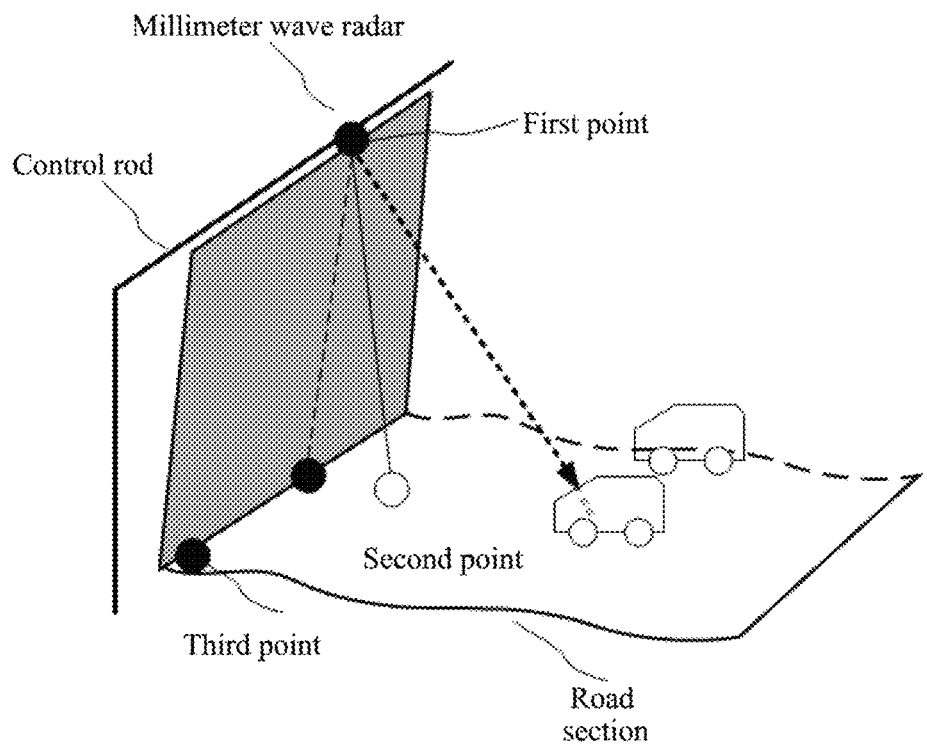
FIG. 4B is another schematic diagram of determining a body surface in a location detection method according to an embodiment of the present application.

FIG. 4B is another schematic diagram of determining a body surface in a location detection method according to an embodiment of the present application. Please refer to FIG. 4B, in a scene where a millimeter wave radar is installed obliquely, the millimeter wave radar determines a first point, a second point, and a third point in sequence when determining its body surface.

Please refer to the description of FIG. 4A for the determination of the first point and the third point, which will not be repeated here.

For the second point, since the location of the second point is related to an installation angle of the millimeter wave radar and the like, the location of the second point in FIG. 4B is different from the location of the second point in FIG. 4A. In FIG. 4B, when determining the second point, the millimeter wave radar makes a projection point of the first point along the body surface, such as an upper surface of the millimeter wave radar, and takes the projection point as the second point. That is to say, the second point is a point on the body surface of the millimeter wave radar, not necessarily a projection point of the first point on a horizontal plane. Since the millimeter wave radar is installed obliquely in FIG. 4B, at this time, the projection point of the first point on the horizontal plane and the second point are two different points. The projection point of the first point is shown by a white circle in the figure.

By adopting this solution, the body surface is determined according to an installation direction of the millimeter wave radar, and a concept of the body surface is introduced in a subsequent location detection, which makes it easy to establish an association relationship between the installation point of the millimeter wave radar and the installation environment and can be expanded to a variety of scenes, reducing harsh environmental requirements of the millimeter wave radar.

In an actual implementation, the body surface of the millimeter wave radar can be determined in many ways. For example, the body surface is an upper surface of the millimeter wave radar. A laser emitting apparatus is disposed on the upper surface of the millimeter wave radar. A point where the laser emitting apparatus is located is taken as the first point. The laser emitting apparatus is used to emit laser along the body surface towards the road section, and an irradiation point of the laser on the road section is the second point. Then, the direction in which the laser emitting apparatus emits the laser is changed, and the third point is obtained by utilizing the changed direction of the laser to irradiate the road section. Finally, the millimeter wave radar uses the three points to determine a plane, that is, the body surface.

Second, the millimeter wave radar determines the upper interface and lower interface of the road section.

When determining the upper interface of the road section, the millimeter wave radar determines at least one fourth point according to a highest point on the road section, and determines the upper interface according to the at least one fourth point. Similarly, when determining the lower interface of the road section, the millimeter wave radar determines at least one fifth point according to a lowest point on the road section, and determines the lower interface according to the at least one fifth point. Exemplarily, please refer to FIG. 5A and FIG. 5B.

Figure 5A:
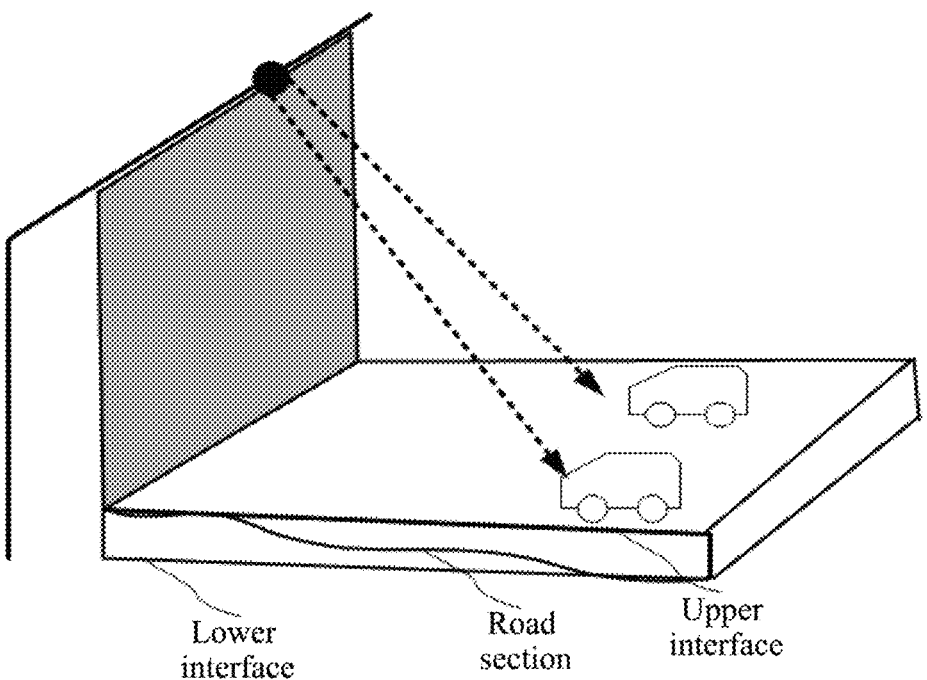
FIG. 5A is a schematic diagram of determining an upper interface and a lower interface in a location detection method according to an embodiment of the present application.

FIG. 5A is a schematic diagram of determining an upper interface and a lower interface in a location detection method according to an embodiment of the present application. Please refer to FIG. 5A, in a scene where a millimeter wave radar is installed non-obliquely, when the millimeter wave radar determines an upper interface of a road section, a tool that can measure elevation is used to measure a highest point on the road section. Then, sampling is performed near the highest point to obtain at least one fourth point. These fourth points and the highest point are located on a same plane, and the plane is parallel to a normal of the body surface, that is, the plane is perpendicular to the body surface. In addition, a next-to-highest point can also be determined according to the highest point, and sampling is performed near the next-to-highest point to obtain at least one fourth point.

Similarly, when the millimeter wave radar determines a lower interface of the road section, the tool that can measure elevation is used to measure a lowest point on the road section. Then, sampling is performed near the lowest point to obtain at least one fifth point. These fifth points and the lowest point are located on a same plane, and the plane is parallel to the normal of the body surface, that is, the plane is perpendicular to the body surface. In addition, a next-to-lowest point can also be determined according to the lowest point, and sampling is performed near the next-to-lowest point to obtain at least one fifth point.

In FIG. 5A, since the millimeter wave radar is installed non-obliquely, the body surface of the millimeter wave radar is perpendicular to a horizontal plane, and the upper interface and lower interface are parallel to the horizontal plane.

Figure 5B:
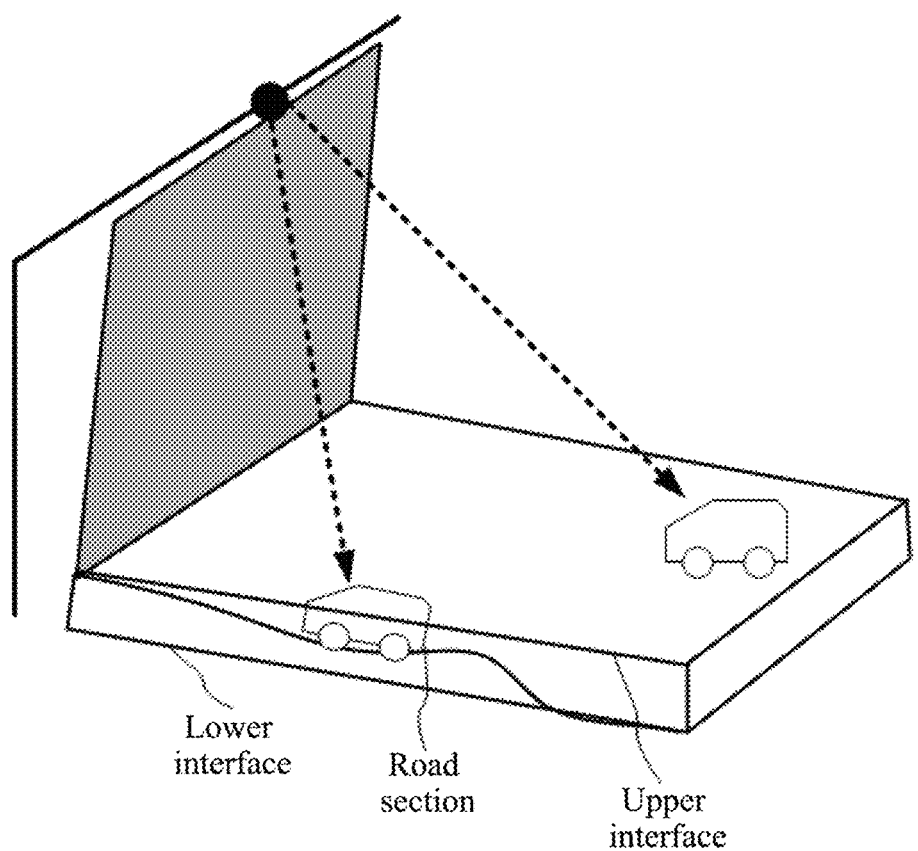
FIG. 5B is another schematic diagram of determining an upper interface and a lower interface in a location detection method according to an embodiment of the present application.

FIG. 5B is another schematic diagram of determining an upper interface and a lower interface in a location detection method according to an embodiment of the present application. Please refer to FIG. 5B, in a scene where a millimeter wave radar is installed obliquely, the determination approach of an upper interface and a lower interface can be seen in FIG. 5A. The difference between FIG. 5B and FIG. 5A is that in FIG. 5B, since the millimeter wave radar is installed obliquely, an angle between a body surface of the millimeter wave radar and a horizontal plane is not a right angle. Moreover, both the upper interface and the lower interface are not parallel to the horizontal plane.

By adopting this solution, the upper interface and the lower interface of the road section are determined according to the body surface of the millimeter wave radar, so that the target location of the target object is no longer an approximate initial location but a precise location obtained according to strict geometric projection, which improves accuracy of location detection and meets requirements for data accuracy in various scenes such as vehicle infrastructure cooperation.

In the above embodiment, in a case that the target object is a vehicle, when the millimeter wave radar performs vehicle infrastructure cooperation according to the target location, a distance between any two target objects is determined according to respective target locations of a plurality of target objects, and prompt information is generated according to the distance and sent to the two target objects corresponding to the distance.

Exemplarily, the millimeter wave radar is installed at an intersection, either side of a road, etc., and can obtain target locations of a plurality of target objects within a coverage area. Then, the millimeter wave radar determines a distance between any two vehicles according to target locations of the two vehicles. Then, the millimeter wave radar generates prompt information according to the distance. For example, if the distance is less than a preset distance, it means that the distance between the two vehicles is relatively close, and prompt information to prompt the following vehicle to brake urgently is generated; for another example, the distance is greater than or equal to the preset distance, which means that the distance between the two vehicles is relatively far, and the millimeter wave radar generates prompt information to prompt the following vehicle to accelerate.

After generating the prompt information, the millimeter wave radar sends the prompt information to a relevant vehicle to make the relevant vehicle adopt a corresponding driving behavior. For example, the millimeter wave radar sends the prompt information to a following vehicle for prompting the following vehicle to brake urgently, so that the following vehicle brakes urgently.

By adopting this solution, the millimeter wave radar performs vehicle infrastructure cooperation according to a precise target location, and cooperation efficiency is high.

In the above embodiment, the road section is a road section in a coverage area of the millimeter wave radar, and the road section is, for example, a slope road section, a wavy road section, or a flat road section, etc. For any target object on the road section, regardless of whether the target object is close to the millimeter wave radar or far away from the millimeter wave radar, when determining the target location, the millimeter wave radar performs weighting and summing up of locations projected twice to obtain the target location, after projecting an initial location of the target object twice. Therefore, the millimeter wave radar can obtain the precise target location of any target object on an entire road section.

By adopting this solution, since a type of road section is not limited, an application range of the millimeter wave radar can be expanded.

The above describes specific implementations of the location detection method in the embodiments of the present application. The following are apparatus embodiments of the present application, which can be used to perform the method embodiments of the present application. For details not disclosed in the apparatus embodiments of the present application, please refer to the method embodiments of the present application.

Figure 6:
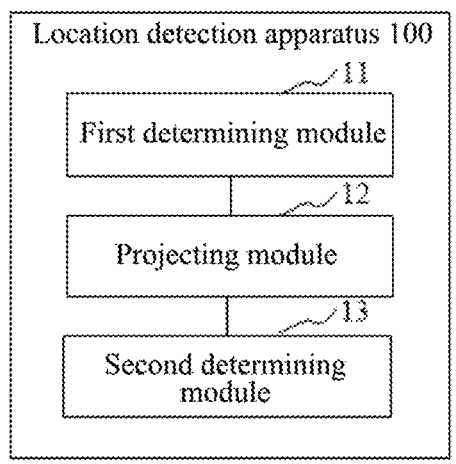
FIG. 6 is a schematic structural diagram of a location detection apparatus according to an embodiment of the present application.

FIG. 6 is a schematic structural diagram of a location detection apparatus according to an embodiment of the present application. The apparatus can be integrated in a millimeter wave radar or realized by the millimeter wave radar. As shown in FIG. 6, in this embodiment, the location detection apparatus 100 can include:

a first determining module 11, configured to determine an initial location of a target object, where the initial location is a relative location of the target object with respect to a millimeter wave radar;

a projecting module 12, configured to project the initial location onto an upper interface of a road section to obtain a first projection location, and project the initial location onto a lower interface of the road section to obtain a second projection location, where the upper interface and the lower interface are perpendicular to a body surface of the millimeter wave radar, the upper interface is determined according to a high point on the road section acquired in advance, and the lower interface is determined according to a low point on the road section acquired in advance;

a second determining module 13, configured to determine a target location of the target object according to the first projection location and the second projection location.

In a feasible design, the second determining module 13 is configured to determine a first distance between the initial location and the upper interface, determine a second distance between the initial location and the lower interface, determine a first weight according to the first distance, determine a second weight according to the second distance, and determine the target location according to the first weight, the second weight, the first projection location and the second projection location.

In a feasible design, when determining the first weight according to the first distance and determining the second weight according to the second distance, the second determining module 13 is configured to determine whether the first distance is greater than a preset threshold, if the first distance is greater than the preset threshold, determine that the first weight is equal to 0; if the first distance is less than or equal to the preset threshold, determine the first weight according to a reciprocal of the first distance; determine whether the second distance is greater than the preset threshold, if the second distance is greater than the preset threshold, determine that the second weight is equal to 0; if the second distance is less than or equal to the preset threshold, determine the second weight according to a reciprocal of the second distance.

Figure 7:
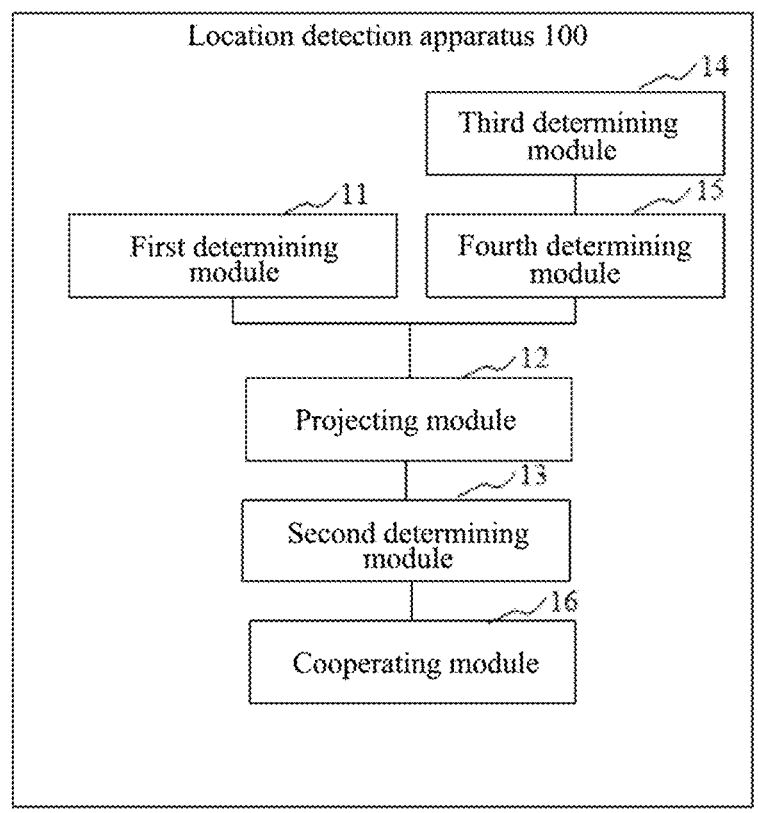
FIG. 7 is a schematic structural diagram of another location detection apparatus according to an embodiment of the present application.

FIG. 7 is a schematic structural diagram of another location detection apparatus according to an embodiment of the present application. Please refer to FIG. 7, on the basis of FIG. 6, the location detection apparatus 100 according to this embodiment further includes:

a third determining module 14, configured to determine the body surface according to a first coordinate of a first point, a second coordinate of a second point and a third coordinate of a third point, before the projecting module 12 projects the initial location onto the upper interface of the road section to obtain the first projection location, and projects the initial location onto the lower interface of the road section to obtain the second projection location, where the first point is an installation point of the millimeter wave radar, the second point is a projection point of the millimeter wave radar along the body surface of the millimeter wave radar toward the road section, and the third point is a projection point of any point on a control rod along the body surface of the millimeter wave radar toward the road section after moving the control rod to the body surface.

Please refer to FIG. 7 again, the location detection apparatus 100 further includes:

a fourth determining module 15, configured to determine at least one fourth point according to a highest point on the road section, determine the upper interface according to the at least one fourth point, determine at least one fifth point according to a lowest point on the road section, and determine the lower interface according to the at least one fifth point, before the projecting module 12 projects the initial location onto the upper interface of the road section to obtain the first projection location, and projects the initial location onto the lower interface of the road section to obtain the second projection location.

Please refer to FIG. 7 again, when the target object is a vehicle, the location detection apparatus 100 further includes:

a cooperating module 16, configured to determine a distance between any two target objects according to respective target locations of a plurality of target objects, generate prompt information according to the distance, and send the prompt information to the two target objects corresponding to the distance.

In a feasible design, the road section is a slope road section.

According to an embodiment of the present application, an electronic device and a readable storage medium are further provided.

Figure 8:
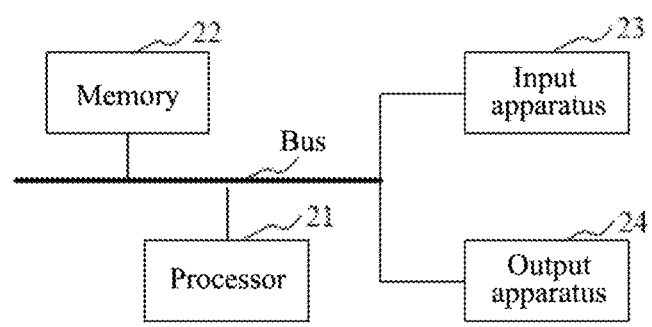
FIG. 8 is a block diagram of an electronic device for implementing a location detection method according to an embodiment of the present application.

FIG. 8 is a block diagram of an electronic device for implementing a location detection method according to an embodiment of the present application. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components shown herein, connections and relationships thereof, as well as functions thereof are merely examples and are not intended to limit implementations of the present application described and/or claimed herein.

As shown in FIG. 8, the electronic device includes: one or more processors 21, a memory 22, and interfaces for connecting various components, including a high-speed interface and a low-speed interface. The various components are interconnected through different buses and can be installed on a common motherboard or be installed in other ways as required. The processor may process instructions executed within the electronic device, where the instructions include instructions stored in or on the memory to display graphical information of Graphical User Interface (GUI) on an external input/output apparatus (such as, a display device coupled to an interface). In other implementations, a plurality of processors and/or a plurality of buses may be used with a plurality of memories, if required. Similarly, a plurality of electronic devices can be connected, each of which provides some of necessary operations (for example, serving as a server array, a set of blade servers, or a multiprocessor system). In FIG. 8, one processor 21 is taken as an example.

The memory 22 is a non-transitory computer-readable storage medium according to the present application. The memory stores instructions executable by at least one processor to cause the at least one processor to perform the location detection method according to the present application. The non-transitory computer-readable storage medium of the present application stores computer instructions, where computer instructions are used to cause a computer to perform the location detection method according to the present application.

The memory 22, as a non-transitory computer-readable storage medium, can be used to store a non-transitory software program, a non-transitory computer-executable program and modules, such as program instructions/modules (e.g., the first determining module 11, the projecting module 12, the second determining module 13 shown in FIG. 6, and the third determining module 14, the fourth determining module 15 and the cooperating module 16 shown in FIG. 7) corresponding to the location detection method in the embodiments of the present application. By running the non-transitory software program, instructions and modules stored in the memory 22, the processor 21 performs various functional applications and data processing of the computer, that is, realizes the location detection method in the above method embodiments.

The memory 22 may include a program storing area and a data storing area, where the program storing area may store an operating system and an application program required by at least one function; and the data storing area may store data created according to the use of the electronic device for performing the location detection method, and so on. In addition, the memory 22 may include a high-speed random-access memory, and may also include a non-transitory memory, such as at least one magnetic disk storage device, a flash memory device, or other non-transitory solid-state memory devices. In some embodiments, the memory 22 may optionally include memories provided remotely with respect to the processor 21, and these remote memories may be connected via a network to the electronic device for performing the location detection method. Examples of the above-mentioned network may include, but are not limited to, the Internet, an intranet, a local area network, a mobile communication network and a combination thereof.

The electronic device for the location detection method may further include: an input apparatus 23 and an output apparatus 24. The processor 21, the memory 22, the input apparatus 23 and the output apparatus 24 may be connected via a bus or other means, and an example of a connection via the bus is shown in FIG. 8.

The input apparatus 23 may receive inputted digital or character information, and generate key signal inputs related to a user setting and functional control of a location detection electronic device. The input apparatus, for example, is a touch screen, a keypad, a mouse, a trackpad, a touchpad, a pointer, one or more mouse buttons, a trackball, a joystick and other input apparatuses. The output apparatus 24 may include: a display device, an auxiliary lighting apparatus (e.g., an LED), a tactile feedback apparatus (e.g., a vibration motor) and the like. The display device may include, but is not limited to, a liquid crystal display (LCD), a light emitting diode (LED) display and a plasma display. In some implementations, the display device may be a touch screen.

Various embodiments of the systems and technologies described herein may be implemented in a digital electronic circuit system, an integrated circuit system, a specialized ASIC (application specific integrated circuit), computer hardware, firmware, software, and/or a combination thereof. These various embodiments may include: being implemented in one or more computer programs, where the one or more computer programs may be executed and/or interpreted on a programmable system including at least one programmable processor, where the programmable processor may be a specialized or general-purpose programmable processor, which may receive data and instructions from a storage system, at least one input apparatus and at least one output apparatus and send data and instructions to the storage system, the at least one input apparatus and the at least one output apparatus.

These computer programs (also referred to as programs, software, software applications, or codes) include machine instructions of a programmable processor and can be implemented by using a high-level procedure and/or object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, which includes a machine-readable medium that receives a machine instruction as a machine-readable signal. The term "machine-readable signal" refers to any signal used to provide a machine instruction and/or data to the programmable processor.

In order to provide interaction with a user, the systems and technologies described herein may be implemented on a computer, where the computer has: a display apparatus (e.g., a CRT (cathode ray tube) or LCD (liquid crystal display) monitor) for displaying information to the user; and a keyboard and a pointing apparatus (e.g., a mouse or a trackball), through which the user can provide inputs to the computer. Other types of apparatuses may also be used to provide interaction with the user; for example, the feedback provided to the user may be any form of sensing feedback (such as, visual feedback, auditory feedback, or tactile feedback); and the input from the user may be received in any form (including acoustic input, voice input, tactile input).

The systems and technologies described here may be implemented in a computing system (e.g., a data server) including a back-end component, or in a computing system (e.g., an application server) including a middleware component, or in a computing system (e.g., a user computer having a graphical user interface or a web browser, through which the user can interact with the implementations of the systems and technologies described herein) including a front-end component, or in a computing system including any combination of the back-end component, the middleware component, or the front-end component. The components of the system may be interconnected via digital data communication (e.g., a communication network) in any form or medium. Examples of the communication network include: a local area network (LAN), a wide area network (WAN) and Internet.

A computer system may include a client and a server. The client and the server are generally located far away from each other and usually interact with each other through a communication network. A relationship between the client and the server is generated by computer programs running on corresponding computers and having a client-server relationship between each other.

An embodiment of the present application provides a vehicle infrastructure cooperation method, including: determining a body surface of a millimeter wave radar and an upper interface and a lower interface of a road section, where the body surface is a plane where the millimeter wave radar is located, and the road section is between the upper interface and the lower interface; determining a target location of a target object according to the body surface, the upper interface and the lower interface; and performing vehicle infrastructure cooperation according to the target location.

In the location detection method, apparatus, device and readable storage medium provided by the embodiments of the present application, a millimeter wave radar acquires an association relationship between an installation point of the millimeter wave radar and installation environment in advance, and the association relationship is, for example, setting an upper interface and a lower interface for a road section covered by the millimeter wave radar, where the upper interface and the lower interface are perpendicular to the body surface where the installation point of the millimeter wave radar is located, and the road section is between the upper interface and the lower interface. Then, after acquiring an initial location of the target object, the millimeter wave radar projects the initial location onto the upper interface and the lower interface respectively to obtain a first projection location and a second projection location, and then determines an accurate location of the target object according to the first projection location and the second projection location. In this process, the initial location is mapped twice to make full use of the association relationship between the installation point and the installation environment, so that the target location is no longer an approximate location, but a precise location obtained according to geometric projection, which improves accuracy of location detection.

It should be understood that steps can be reordered, added, or deleted by using the various forms of processes shown above. For example, the steps recited in the present application can be performed in parallel, in sequence or in different orders, as long as expected results of the technical solutions disclosed by the present application can be realized, and there is no limitation herein.

The above specific implementations do not limit the protection scope of the present application. It should be understood by those skilled in the art that various modifications, combinations, sub-combinations and substitutions may be made according to design requirements and other factors. Any modification, equivalent replacement and improvement made within the spirit and principle of the present application shall be included in the protection scope of the present application.

What is claimed is:

1. A location detection method, comprising:
   determining an initial location of a target object, wherein the initial location is a relative location of the target object with respect to a millimeter wave radar;
   projecting the initial location onto an upper interface of a road section to obtain a first projection location, and projecting the initial location onto a lower interface of the road section to obtain a second projection location, wherein the upper interface and the lower interface are perpendicular to a body surface of the millimeter wave radar, the upper interface is determined according to a high point on the road section acquired in advance, and the lower interface is determined according to a low point on the road section acquired in advance;
   determining a target location of the target object according to the first projection location and the second projection location.

2. The method according to claim 1, wherein the determining the target location of the target object according to the first projection location and the second projection location comprises:
   determining a first distance between the initial location and the upper interface, and determining a second distance between the initial location and the lower interface;
   determining a first weight according to the first distance, and determining a second weight according to the second distance;
   determining the target location according to the first weight, the second weight, the first projection location and the second projection location.

3. The method according to claim 2, wherein the determining the first weight according to the first distance, and determining the second weight according to the second distance comprises:
   determining whether the first distance is greater than a preset threshold, if the first distance is greater than the preset threshold, determining that the first weight is equal to 0; if the first distance is less than or equal to the preset threshold, determining the first weight according to a reciprocal of the first distance;
   determining whether the second distance is greater than the preset threshold, if the second distance is greater than the preset threshold, determining that the second weight is equal to 0; if the second distance is less than or equal to the preset threshold, determining the second weight according to a reciprocal of the second distance.

4. The method according to claim 1, before projecting the initial location onto the upper interface of the road section to obtain the first projection location, and projecting the initial location onto the lower interface of the road section to obtain the second projection location, further comprising:
   determining the body surface according to a first coordinate of a first point, a second coordinate of a second point and a third coordinate of a third point, wherein the first point is an installation point of the millimeter wave radar, the second point is a projection point of the millimeter wave radar along the body surface of the millimeter wave radar toward the road section, and the third point is a projection point of any point on a control rod along the body surface of the millimeter wave radar toward the road section after moving the control rod to the body surface.

5. The method according to claim 1, before projecting the initial location onto the upper interface of the road section to obtain the first projection location, and projecting the initial location onto the lower interface of the road section to obtain the second projection location, further comprising:
   determining at least one fourth point according to a highest point on the road section, and determining the upper interface according to the at least one fourth point;
   determining at least one fifth point according to a lowest point on the road section, and determining the lower interface according to the at least one fifth point.

6. The method according to according to claim 1, wherein the target object is a vehicle, and the method further comprises:
   determining a distance between any two target objects according to respective target locations of a plurality of target objects;
   generating prompt information according to the distance;
   sending the prompt information to the two target objects corresponding to the distance.

7. The method according to claim 1, wherein the road section is a slope road section.

8. A location detection apparatus, comprising:
   at least one processor; and
   a memory, in a communicational connection with the at least one processor; wherein,
   the memory stores instructions executable by the at least one processor, and the instructions are executed by the at least one processor, so that the at least one processor is configured to:
   determine an initial location of a target object, wherein the initial location is a relative location of the target object with respect to a millimeter wave radar;
   project the initial location onto an upper interface of a road section to obtain a first projection location, and project the initial location onto a lower interface of the road section to obtain a second projection location, wherein the upper interface and the lower interface are perpendicular to a body surface of the millimeter wave radar, the upper interface is determined according to a high point on the road section acquired in advance, and the lower interface is determined according to a low point on the road section acquired in advance;
   determine a target location of the target object according to the first projection location and the second projection location.

9. The location detection apparatus according to claim 8, wherein: the at least one processor is configured to determine a first distance between the initial location and the upper interface, determine a second distance between the initial location and the lower interface, determine a first weight according to the first distance, determine a second weight according to the second distance, and determine the target location according to the first weight, the second weight, the first projection location and the second projection location.

10. The location detection apparatus according to claim 9, wherein: when the at least one processor determines the first weight according to the first distance, and determines the second weight according to the second distance, the at least one processor is configured to: determine whether the first distance is greater than a preset threshold, if the first distance is greater than the preset threshold, determine that the first weight is equal to 0; if the first distance is less than or equal to the preset threshold, determine the first weight according to a reciprocal of the first distance; determine whether the second distance is greater than the preset threshold, if the second distance is greater than the preset threshold, determine that the second weight is equal to 0; if the second distance is less than or equal to the preset threshold, determine the second weight according to a reciprocal of the second distance.

11. The location detection apparatus according to claim 8, further comprising: the at least one processor is configured to determine the body surface according to a first coordinate of a first point, a second coordinate of a second point and a third coordinate of a third point before the at least one processor projects the initial location onto the upper interface of the road section to obtain the first projection location, and projects the initial location onto the lower interface of the road section to obtain the second projection location, wherein the first point is an installation point of the millimeter wave radar, the second point is a projection point of the millimeter wave radar along the body surface of the millimeter wave radar toward the road section, and the third point is a projection point of any point on a control rod along the body surface of the millimeter wave radar toward the road section after moving the control rod to the body surface.

12. The location detection apparatus according to claim 8, further comprising: the at least one processor is configured to determine at least one fourth point according to a highest point on the road section, determine the upper interface according to the at least one fourth point, determine at least one fifth point according to a lowest point on the road section, and determine the lower interface according to the at least one fifth point, before the at least one processor projects the initial location onto the upper interface of the road section to obtain the first projection location, and projects the initial location onto the lower interface of the road section to obtain the second projection location.

13. The location detection apparatus according to claim 8, wherein the target object is a vehicle, and the apparatus further comprises: the at least one processor is configured to determine a distance between any two target objects according to respective target locations of a plurality of target objects, generate prompt information according to the distance, and send the prompt information to the two target objects corresponding to the distance.

14. The location detection apparatus according to claim 8, wherein the road section is a slope road section.

15. A non-transitory computer-readable storage medium storing computer instructions, wherein the computer instructions are used to cause a computer to perform the method according to claim 1.

16. The non-transitory computer-readable storage medium according to claim 15, wherein the computer instructions are further used to perform the following steps:
determining a first distance between the initial location and the upper interface, and determining a second distance between the initial location and the lower interface;
determining a first weight according to the first distance, and determining a second weight according to the second distance;
determining the target location according to the first weight, the second weight, the first projection location and the second projection location.

17. The non-transitory computer-readable storage medium according to claim 16, wherein the computer instructions are further used to perform the following steps:
determining whether the first distance is greater than a preset threshold, if the first distance is greater than the preset threshold, determining that the first weight is equal to 0; if the first distance is less than or equal to the preset threshold, determining the first weight according to a reciprocal of the first distance;
determining whether the second distance is greater than the preset threshold, if the second distance is greater than the preset threshold, determining that the second weight is equal to 0; if the second distance is less than or equal to the preset threshold, determining the second weight according to a reciprocal of the second distance.

18. The non-transitory computer-readable storage medium according to claim 15, wherein the computer instructions are further used to perform the following steps:
determining the body surface according to a first coordinate of a first point, a second coordinate of a second point and a third coordinate of a third point, wherein the first point is an installation point of the millimeter wave radar, the second point is a projection point of the millimeter wave radar along the body surface of the millimeter wave radar toward the road section, and the third point is a projection point of any point on a control rod along the body surface of the millimeter wave radar toward the road section after moving the control rod to the body surface.

19. The non-transitory computer-readable storage medium according to claim 15, wherein the computer instructions are further used to perform the following steps:
determining at least one fourth point according to a highest point on the road section, and determining the upper interface according to the at least one fourth point;
determining at least one fifth point according to a lowest point on the road section, and determining the lower interface according to the at least one fifth point.

20. The non-transitory computer-readable storage medium according to claim 15, wherein the computer instructions are further used to perform the following steps:
determining a distance between any two target objects according to respective target locations of a plurality of target objects;
generating prompt information according to the distance;
sending the prompt information to the two target objects corresponding to the distance.

* * * * *